UNITED STATES PATENT OFFICE.

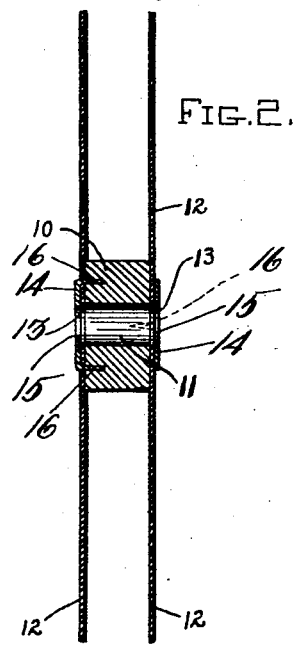
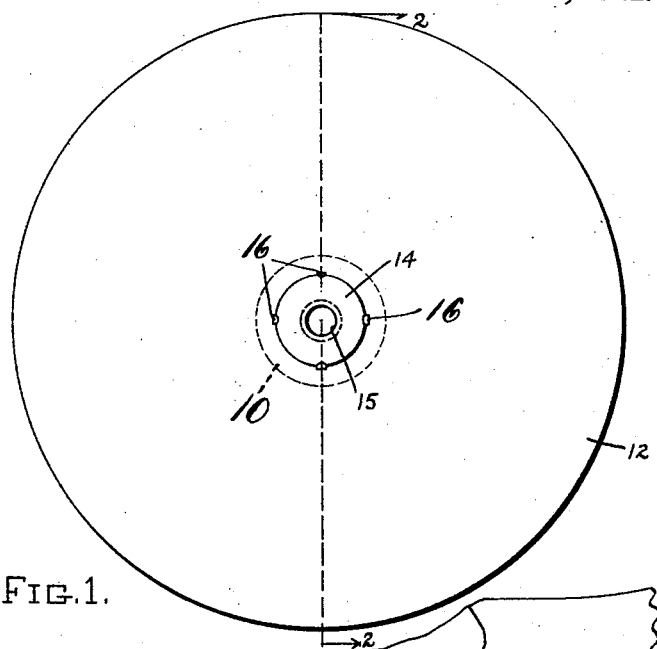
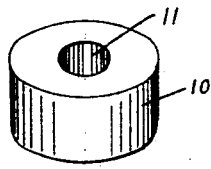
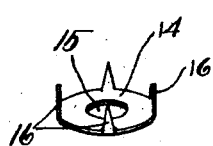
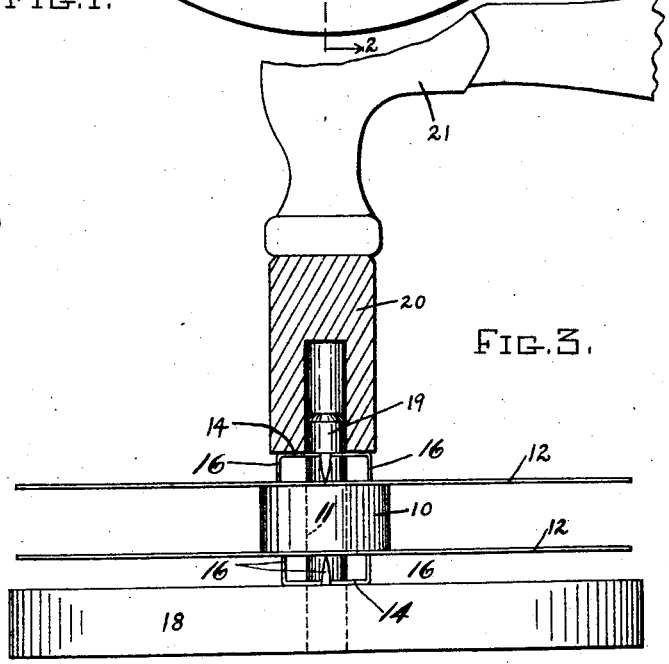
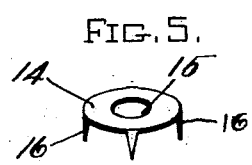

FRANK J. GRAMELSBACH, OF PAWTUCKET, RHODE ISLAND, ASSIGNOR TO EVERLASTIK, INCORPORATED, OF BOSTON, MASSACHUSETTS, A CORPORATION OF MASSACHUSETTS.

TAPE OR RIBBON REEL.

1,409,945.

Specification of Letters Patent.   Patented Mar. 21, 1922.

Application filed March 29, 1921. Serial No. 456,583.

*To all whom it may concern:*

Be it known that I, FRANK J. GRAMELSBACH, a citizen of the United States, residing at Pawtucket, in the county of Providence and State of Rhode Island, have invented new and useful Improvements in Tape or Ribbon Reels, of which the following is a specification.

This invention has for its object to provide an inexpensive reel for tapes, ribbons or other relatively narrow webs. It comprises a central hub or spool, which may with convenience be made of wood; end disks preferably formed of pasteboard, cardboard or other equivalent material; and metallic pronged washers, the prongs of which are driven through the end disks into the spool or hub.

On the accompanying drawing,—

Figure 1 illustrates a reel embodying the invention.

Figure 2 represents a section through the same.

Figure 3 shows the parts in position to be secured together.

Figure 4 shows the central hub or spool.

Figures 5 and 6 show one of the pronged washers or fastening members.

On the drawing,—10 indicates a central hub or spool which is cylindrical in form with a central bore 11, and which is preferably formed of wood or other material into which pointed fastenings may easily be driven. 12, 12 indicate two disks or circular members formed of stiff paper, pasteboard, cardboard or the like, and having central apertures 13, 13, of the same diameter as the bore of the spool 10. On the outer faces of these disks or members may be imprinted legends indicating the name of the manufacturer, and the kind and quality of the goods coiled thereon, trade-marks, and other advertising matter. At 14, 14, are indicated metallic washers, each centrally apertured at 15. Each washer has at its rim a plurality of pointed prongs 16 formed integrally therewith and projecting perpendicularly to the face thereof. I have shown each washer 14 as having four equally-spaced prongs 16, but this number may be reasonably increased or diminished as desired. Each washer has its prongs so located radially from its center that the prongs may be driven into the hub, approximately half way between its inner and outer walls.

The diameter of the apertures 15 is less than that of the bore of the hub, so that, when the reels are placed on a shaft for the removal of the webs thereon, the metal washers provide uniform metallic bearings for engagement with such shaft, and remove the relatively rough interior surfaces of the bores of the hubs from such engagement. It frequently happens that the bores of the hubs are irregular, but, by making them of relatively large size and reducing the diameter of the apertures in the washers, such irregularities cause no trouble, when the reels are strung on a shaft.

The parts may be assembled as follows: a metal block or anvil 18, having an upstanding cylindrical post 19 of a diameter only slightly less than the bore of the spool so that the post may fit in such bore, is provided, and on the post are strung or placed first a washer 14 to rest on the anvil with its prongs 16 projecting upwardly, next an end disk 12, then the wooden hub or spool 10, then a disk 12, and finally a washer with its prongs projecting downwardly. Then a sleeve 20 is slipped on the post, and it is forced downwardly to cause the prongs of the two washers to be driven into the ends of the hub and the inner faces of the washers to clamp the end disks 12 against the end face of the central hub or spool. The sleeve or equivalent member 20 may be power-operated, if desired; though, if desired, a hand-operated hammer 21 may be employed for driving it down on the post to accomplish the securing of the parts of the reel together.

Ordinarily the tape or ribbon has its end secured to the hub, and is coiled thereon, prior to the attachment to the hub of the end disks, and the pronged washers are secured thereto.

What I claim is:—

1. A reel for tapes, ribbons or the like, comprising a central cylindrical hub, end disks lying flat against the end faces of the hub, and washers engaging the outer faces of the disks and having integral prongs passed through the said disks into the ends of the central hub.

2. A reel for tapes, ribbons or the like, comprising a central tubular wooden hub, circular fiber disks lying flat against the ends of the hub and projecting radially beyond the same, and metallic washers bearing against the outer faces of such disks and having integral prongs projecting through said disks into the ends of said hub.

3. A reel for tapes, ribbons or the like, comprising a central tubular wooden hub, circular disks lying flat against the end faces of the hub and projecting radially beyond the same, and pronged metallic washers attaching said disks to said hub, said washers having central apertures less in diameter than the bore of said hub, substantially as described.

In testimony whereof I have affixed my signature.

FRANK J. GRAMELSBACH.